United States Patent [19]
Omeis et al.

[11] Patent Number: 5,247,377
[45] Date of Patent: Sep. 21, 1993

[54] PROCESS FOR PRODUCING ANISOTROPIC LIQUID CRYSTAL LAYERS ON A SUBSTRATE

[75] Inventors: Juergen Omeis, Seeheim-Jugenheim; Norbert Rau, Sulzbach; Michael Kunesch, Babenhausen, all of Fed. Rep. of Germany

[73] Assignee: Rohm GmbH Chemische Fabrik, Darmstadt, Fed. Rep. of Germany

[21] Appl. No.: 383,631

[22] Filed: Jul. 24, 1989

[30] Foreign Application Priority Data

Jul. 23, 1988 [DE] Fed. Rep. of Germany ....... 3825066

[51] Int. Cl.$^5$ .................. G02F 1/13; G11C 13/04; C09K 19/00
[52] U.S. Cl. .................. 359/76; 359/78; 252/299.01; 365/108; 428/1
[58] Field of Search .......... 252/299.01, 299.1, 299.65, 252/299.66, 299.67, 299.7, 33 P; 359/76, 78; 365/108; 428/1

[56] References Cited

U.S. PATENT DOCUMENTS

| | | | |
|---|---|---|---|
| 4,293,435 | 10/1981 | Portugall et al. | 252/299.01 |
| 4,702,558 | 10/1987 | Coles et al. | 350/330 |
| 4,837,745 | 6/1989 | Eich et al. | 365/108 |
| 4,886,718 | 12/1989 | Eich et al. | 430/20 |
| 5,054,888 | 10/1991 | Jacobs et al. | 252/299.01 |

FOREIGN PATENT DOCUMENTS

| | | |
|---|---|---|
| 0038460 | 10/1981 | European Pat. Off. . |
| 2627215 | 1/1977 | Fed. Rep. of Germany . |
| 2640824 | 3/1977 | Fed. Rep. of Germany . |
| 2831909 | 2/1980 | Fed. Rep. of Germany . |
| 2902177 | 7/1980 | Fed. Rep. of Germany . |
| 3034249 | 3/1981 | Fed. Rep. of Germany . |
| 3014933 | 10/1981 | Fed. Rep. of Germany . |
| 3027571 | 2/1982 | Fed. Rep. of Germany . |
| 3603266 | 8/1987 | Fed. Rep. of Germany . |
| 3603267 | 8/1987 | Fed. Rep. of Germany . |
| 2045274 | 10/1980 | United Kingdom . |
| 2064572 | 6/1981 | United Kingdom . |
| 2146787 | 4/1985 | United Kingdom . |
| 2193338 | 2/1988 | United Kingdom . |

*Primary Examiner*—Robert L. Stoll
*Assistant Examiner*—Sheam C. Wu
*Attorney, Agent, or Firm*—Oblon, Spivak, McClelland, Maier & Neustadt

[57] ABSTRACT

A process for producing thin, anisotropic layers composed of liquid crystalline substances, the liquid crystalline substances being applied in a thin layer to one side of a support having a surface prestructured in such a way that the structure is given a preferred direction which determines orientation of the liquid crystalline substance and data storage devices produced.

30 Claims, 2 Drawing Sheets

PROCESS FOR PRODUCING ANISOTROPIC LIQUID CRYSTAL LAYERS ON A SUBSTRATE

BACKGROUND OF THE INVENTION

1. Field of the Invention

The invention relates to a process for producing thin, anisotropic layers on surface-structured supports.

2. Discussion of the Background

It is known that liquid crystalline substances may be directionally and hence anisotropically oriented by external forces (see Ullmann's Encyclopadie der tech. Chemie, 4th Ed., Vol. 11, pp. 658-671, Verlag Chemie, 1976). Such external forces include electromagnetic fields or mechanical forces, generally shearing or deformation. In addition, surface effects may be utilized, such as those that appear in a uniaxially stretched polyimide (see de Jeu, Physical Properties of Liquid Crystalline Material, Chapter 2, p. 16; J. Cognard, Mol. Cryst. Liq. Cryst. Supplement 1, p. 1 (1982); J. M. Geary, J. W. Goodby, A. R. Kmets, J. S. Patel, J. Appl. Phys., 62, 4100-4108 (1987).

Technically, such liquid crystalline systems are usually used in a sandwich configuration for display applications (see Kelker-Hatz, Handbook of Liquid Crystals, Chapter 14, p. 611, Verlag Chemie (1980)). With such display cells, macroscopically orientated liquid crystal domains are obtained, such as those used for digital optical display instruments and the like.

Layer thicknesses are between 5-50 microns and are formed by what are known as spacers. The cells are customarily filled by making use of capillary action. In order to produce oriented liquid crystal polymers, the display method has generally been used (see GB-A 2,146,787; GB-A 2,193,338).

The size of the display cells for liquid crystalline polymers is necessarily limited to a maximum of 50×50 mm by the viscosity and flow properties of polymers. The filling of the cells in layer thickness of up to 25 microns had to be performed in a vacuum at a high temperatures ($T_K$+5K). They then had to be tempered to below the clearing temperature ($T_K$) in order to obtain thorough macroscopic orientation. This process on the one hand involves considerable expenditure of time and subjects the liquid crystal polymers to thermal stress and on the other hand works only for displays of small dimensions.

SUMMARY OF THE INVENTION

Accordingly, one object of the present invention is a process for producing orientated liquid crystal polymer films that avoids the above-mentioned disadvantages and in particular does not require substantially new equipment.

This and other objects which will become apparent from the following specification have been achieved by the present process for producing thin anisotropic layers composed of liquid crystalline substances where the liquid crystalline substances are applied as a thin layer to at least one side of a support with a surface previously structured in such a way that the structure has a preferred direction which determines the orientation of the liquid crystalline substances, and the data storage device produced.

DETAILED DESCRIPTION OF THE PREFERRED EMBODIMENTS

Figure 1:
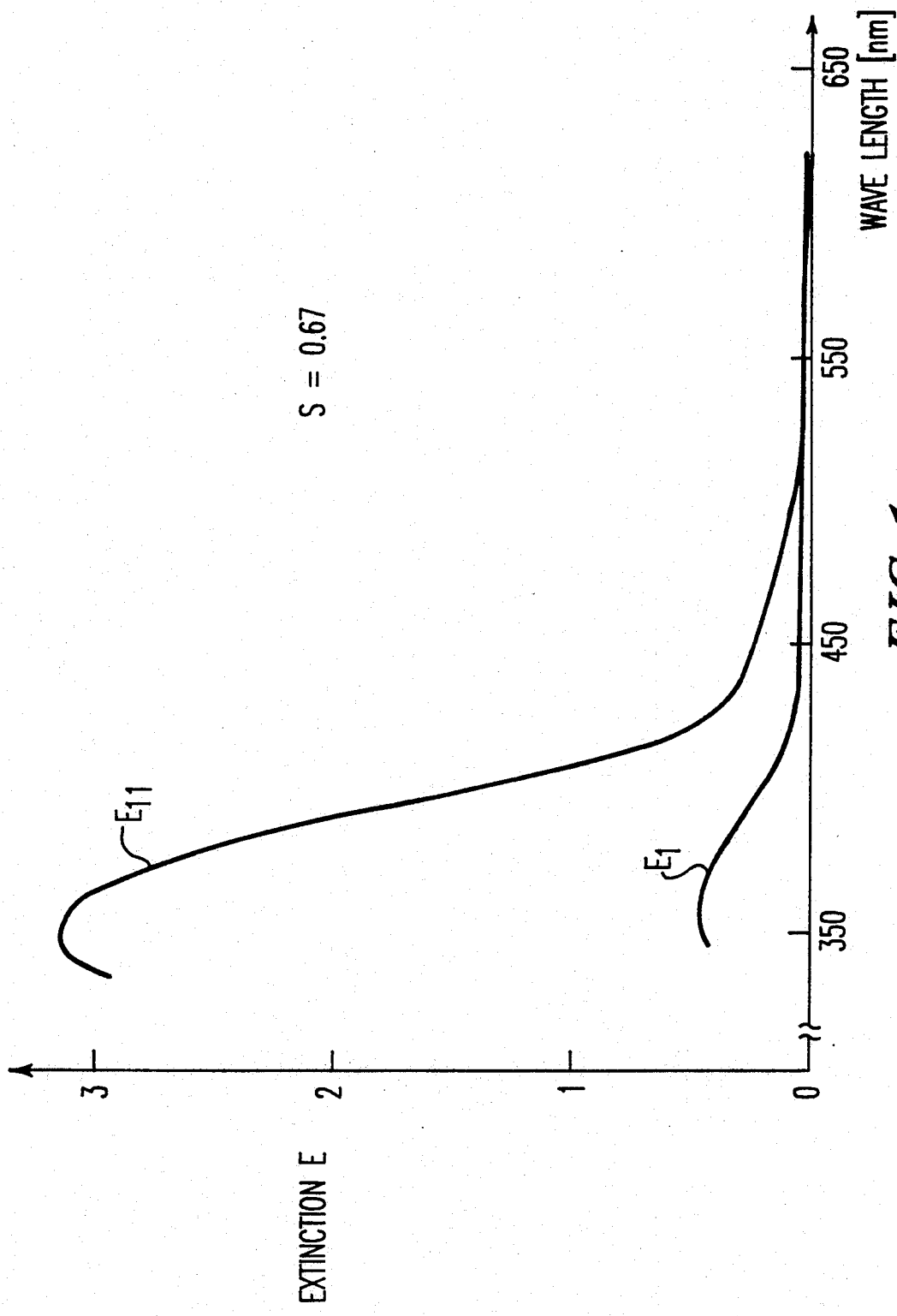
FIG. 1 shows a UV-VIS spectrum of the polymer of Example 1 coated on a polyimide-treated glass sheet and oriented.

In the present invention, application on one side of a substrate means in practice that the principle of introducing the material into the closed space of a cell as in prior processes can be eliminated.

The liquid crystalline substances are selected from the among the following:
a) liquid crystal main chain polymers
b) liquid crystal side chain polymers
c) liquid crystal monomers and other liquid crystalline low molecular weight compounds, optionally in combination with a material to stabilize the thin layer.

The method of production and properties of liquid crystalline substances as such are known in the art.

a) Liquid crystal main chain polymers

Liquid crystal main chain polymers are described in M. G. Dobb, J. E. McIntyre in Advances in Polymer Sciences 60/61, Liquid Crystal Polymers, pp. 61-98, Springer Verlag (1984); DE-A 3,603,266; and A. Griffin, J. F. Johnsen, Liquid Crystals and Ordered Fluids, Vol. 4, Plenum Press, New York (1984) for example.

In the liquid crystal main chain polymers, the chains are generally formed of relatively rigid, mesogenic groups and flexible spacer groups. It is also usually the case that the rigid and flexible groups alternate regularly along the chain.

The polymerization mechanism is generally that of polycondensation. Thus, the liquid crystal main chain polymers preferably belong to one of the following classes of polymers, i.e., polyester type, polyester-amide type, or polysiloxane (silicon) type. See I. Watanabe, W. R. Kriegbaum, J. Polym. Sci., Polym. Phys. Ed. 23, 565-574 (1985); A. Blumstein Polym. J., 17, 277-288 (1985); S. B. Clough, A. Blumstein, E. C. Hso, Macromolecules, 9, 123-127 (1976); C. Noel, F. L. Laupretre, C. Friedrich, B. Fayolle, L. Bosio, Polymer, 25, 808-814 (1984); and R.W. Lenz, Polym. J., 17, 105-155 (1985).

The polycondensation process, as such, is accomplished in a conventional manner. In general, the molecular weights of the polymers produced are in the range of about 1,000 to 20,000 as determined by gel permeation chromatography. The glass temperature ($T_g$) of the liquid crystal polymers used in accordance with the invention is generally between 40° C. and 100° C. Regarding glass temperature $T_g$, see I. Brandrup and E. H. Immergut, Polymer Handbook, 2nd Ed., 111-139, J. Wiley (1975).

b) Liquid crystal side chain polymers

Liquid crystal side chain polymers are described in H. Finkelmann, G. Rehage, Advances in Polymer Science 60/61, Liquid Crystal Polymers II/III, pp. 99-172, Springer-Verlag (1984); and DE-A 36 03 267).

The liquid crystal side chain polymers to be used in accordance with the invention consist in whole or in part of repeated units that can be schematically represented by Formula I

where A—B are the components of the main chain of the polymer, X is an interval-maintaining unit ("spacer") and Y is a mesogenic unit. Of particular interest are side chains of the smectic and nematic type.

The component A—B is preferably derived from radically polymerizable units A'—B' and the corresponding monomer: A'—B'—X—Y. Units A'—B' should preferably be vinyl groups, such as occur in radically polymerizable vinyl compounds, for example:

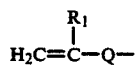

units, where $R_1$ stands for hydrogen or methyl and Q for a function activating the double bond, such as the —C(O)—O—, —C(O)—NR$_2$—, —C(O)—, or —C$_6$H$^4$— groups,*)

The spacer group X constitutes a flexible chain with 1-14 chain members, preferably an alkylene group —(CH$_2$)$_n$—where the value of n may be 1 to 14. In the alkylene group, a halogen such as chlorine, bromine, fluorine or iodine, for example, may be substituted for individual hydrogen atoms on the chain members or one or more of the chain members may be replaced by an ether bridge. *) wherein $R_2$ stands for hydrogen or an alkyl group with 1 to 6 carbon atoms.

The mesogenic unit Y may contain a linking function such as —O—, —C(O)—O—, —C(O)-NR$_2$—, —O—C(O)— or —NR$_2$—C(O)—, linking the spacer group X with the actual mesogenic group.

A list of suitable mesogenic groups can be found in Kelker and Hatz, Handbook of Liquid Crystals, Verlag Chemie (1980), loc. cit., pp. 67-113.

c) Liquid crystal monomers

Suitable liquid crystal monomers include, for example, the monomers described under b) above, such as mono- and bi-functional acrylates with spacer lengths preferably of n=5 or 6, where the mesogenic compound is preferably a phenyl benzoate or a hydroquinone dibenzoate. Also of interest are azobenzenes, biphenyl 1,4-bis-(benzoyloxy)cyclohexanes, stilbenes, terephthalates, Schiff bases, and azoxybenzenes.

It is advantageous for the liquid crystalline substances to contain at least one chromophore group. A chromophore group as used in the present invention means a group that has an absorption of >10% at a wavelength in the wavelength range from 300 to 1,000, and preferably to 300-700 nm. (Determination according to the method of H. Blume, H. Gusten, Ultraviolette Strahlen, Ed. J. Kiefer, De Gruyter, Verlag, Berlin (1977), pp. 311-319).

The chromophore groups may be linked by covalent bonds to the liquid crystalline substances, or they may be present in mixtures. Of special interest is the situation in which the chromophore groups are components of the liquid crystal polymers, particularly the case in which monomers with chromophore groups are contained in the polymers. Polymers that contain chromophore groups are known in the art as in, for example, DE-A 3,027,571 and EP-B 0 090 282. Chromophore substances for low molecular weight liquid crystals or liquid crystal mixtures are disclosed in, for example, DE-A 26 27 215, DE-A 26 40 824, DE-A 29 02 177, DE-A 30 34 249, DE-A 30 14 933 and in Ringsdorf et al., Makromol. Chem. 188, 1355 (1987), M. Eich, H. J. Wendorff, Makromol. Chem. Rapid Commun., 8, 467 (1987), R. J. Cox, Mol. Cryst. Liq. Cryst., 55, 1-32 (1979) and G. W. Gray, Chimia, 34, 47 (1980).

Methods of producing polymers containing mesogenic groups are taught in DE-A 28 31 909.

Stabilizing material

The stabilizing material acts as a linking phase between the liquid crystalline substances and hence has minimum viscosity of $>10^4$ Pa.s and should form films or contribute to film formation. It generally comprises polymers that are used for thickening, selected, for example, from among the group of acrylate polymers, polyvinyl alcohols, polyvinyl acetals, or ethylene-vinyl acetate copolymers.

As previously mentioned, also suitable are mixtures of liquid crystalline substances such as bifunctional acrylates with the mesogenic unit hydroquinone dibenzoate, that are mixed with various spacer lengths (e.g., 5 and 6 spacer units). Also suitable are hydroquinone dibenzoates with bifunctional bisphenol-O-derivatives (0-100% of the dibenzoate components); bifunctional hydroquinone dibenzoates with monofunctional liquid crystalline acrylates (generally in a 50:50 mixture ratio) with the following mesogenic groups: p-methoxyphenyl benzoate, biphenyl benzoate, 1-propyl-4-phenylcyclohexylphenyl benzoate, mixtures of low molecular weight liquid crystalline substances and liquid crystal side chain polymers, such as the product ZLi 1114 (Merck AG) and poly-p-acryloyloxypentyloxycyanobiphenyl (MW=5-10,000 g/mole).

The Process

By a "thin layer" is meant any thin layer, particularly a thin layer that meets the generally accepted specifications of optical components for the given technical application, e.g., in the field of data storage in general, and in holography and integrated optics in particular. As a rule the "thin layer" will have a layer thickness in the range from about 0.1-5 microns, preferably 0.3-4 microns, but the thickness may vary deviating upward or downward as desired.

In one embodiment of the invention, the liquid crystalline substances may be applied from a liquid phase. As the solvent, inert solvents and solvent mixtures that ensure an even, homogeneous coating of the support are especially preferred. In general, their boiling points should not be substantially higher than 100° C., and preferably not higher than 50° C. The following can be mentioned as preferred examples: alkyl halides such as methylene chloride, and perchloroethylene, aromatic hydrocarbons such as toluene, alcohols such as isopropanol, particularly in a mixture with toluene, ketones such as acetone, methyl ethyl ketone and methyl isobutyl ketone, ethers such as tetrahydrofuran, and esters such as ethyl acetate, as well as useful mixture of these. In certain cases, the use of dimethyl formamide (b.p.=152° C.) and cyclohexanone (b.p.=153°-156° C.) may also be used.

In general, the liquid crystalline substances are applied in relatively concentrated solutions (e.g. about 10–25% by weight). Alternatively, the liquid crystalline substances can also be applied as a coating by themselves without solvent, provided they are suitable for the purpose. As a rule of thumb, liquid crystalline substances with a viscosity ($\eta$) in the range of 100–10$^4$ cp can be applied directly as a coating (determination pursuant to DIN Taschenbuch No. 18, "Materialprüfnorm für Kunststoff, Kautschuk und Gummi").

For the actual coating, conventional methods can be used, such as dipping, drawing, spinning and modified methods, such as squeegee coating. (See Oberflächen und Dünnschicht Technologie, Vol. 1, Beschichtung von Oberflächen, Ed. R. Haefer, Springer-Verlag Verlag, Berlin (1987), pp. 261–262).

When application is made by the drawing method, drawing speeds in the range of 10–200 cm/min have been found reliable. With spin-coating, the revolution speed should be in the range of about 500–3,000 rpm. If appropriate parameters are maintained, the desired layer thickness can be obtained with the desired range, i.e., for the most part in a range from about 0.1 to 5 microns. Complete orientation of such layers is then assured. In general, orientation occurs under normal conditions, preferably in a temperature range of $T_K - 5^0 K$ ($T_K$ = clearing temperature) and is completed within a few minutes.

The dimensions of the supporting plate are generally not critical, i.e, the surface dimensions generally do not have a limiting effect when structured material is present.

The process pursuant to the invention makes it possible to apply several layers in succession and to orient them in different directions, if desired. The support may be coated on one or more of its surfaces. On different supporting plates, laminates with different preferred directions can be created.

Similarly, on top of a thin, oriented layer of the liquid crystalline substances, a transparent covering layer can be applied, using the coating methods described above, such that the light absorption properties of the covering layer do not overlap with or at least do not distort the absorption of electromagnetic radiation, particularly light, by the liquid crystalline substances. The covering layers serve to protect against physical and mechanical damage to the thin oriented layer of the liquid crystalline substances. Preferably, the transparent covering layer has a refractive index which is similar to the refractive index of the liquid crystalline material itself. Non-limiting examples of suitable transparent covering materials include a layer of glass and abrasion resistant polymers, optionally mixed with metal oxides. The thickness of the transparent covering layer depends on the application for which the oriented liquid crystalline product is to be used. In general, thicknesses ranging from about 10 microns to about 10 millimeters are satisfactory.

Alternatively, the liquid crystalline substances may even be applied as a powder, granulate, etc. and melted onto the substrate, if they have the appropriate properties, particularly sufficient thermal stability. In this process the working temperature will not as a rule exceed 150° C.

The Supporting Material

The supporting material (substrate) will generally constitute an essentially flat surface from a macroscopic standpoint with dimensions that will vary within the limits set by production considerations. The prerequisite for suitability for use as the supporting material in the present invention is that at least the surface intended for coating be previously so structured (pre-structured) that the surface structure has a preferred direction that will determine the orientation of the coating.

The surface of the support may consist of a layer of a suitable directional surface structure material that is different from the body of the support. This layer may be selected from among the following: polyimides (see K. L. Mittal in "Polyimides," Plenum Press, New York (1984)), polyvinyl alcohols, silicon dioxide, polyethylene terephthate, polystyrene, poly(meth)acrylates, such as polymethyl methacrylate, nylon 66 and alkyl silanes (silanene) for example. In general, the layer applied to the surface of the support may be any amorphous polymer which can be prestructured to provide a surface structure which will determine the orientation of the liquid crystalline material. The layer of the surface of the support may also comprise the liquid crystalline polymer itself.

In general, the layer will be at least thick enough that the directional structure created can be permanently established or fixed. Generally a thickness of about 0.01 to 0.1 micron will be sufficient for the purpose; layer thicknesses greater than this are also, of course, suitable. The actual application of the layer of material to the support may be done by a conventional method, e.g., by spin coating with Liquicoat ZLi 2650 ® made by Merck AG.

Alternatively, the direction determining orientation may be given by corresponding surface patterning of the supporting material itself, i.e., the supporting material and the directional surface structure material may be identical. The following are suitable for the supporting material:

inorganic materials such as glass, metal, ceramics, that may be optionally coated;

a material laminated onto the given base, e.g., plate glass laminated with reflective metal, or plate glass with a conductive coating; and organic polymers, such as polymethyl methacrylate (PMMA), polycarbonate (PC), polyethylene terephthalate (PET) or nylon, which maintain their surface structure during the coating process.

The preferred direction will generally be produced by uniaxially oriented deformations of the surface, which on the microscopic level may assume the form of (parallel) grooves, for example. Not included in the procedures pursuant to the invention is a uniform molecular orientation of the surface layer as is done, for example, with semi-crystalline and liquid crystalline main chain polymers. (See J. M. Geary et al., J. Appl. Phys., 62, 4100–4108, (1987)). While not intending to be bound by any particular theory, the main difference between the method of the present invention and the orientation described by Geary et al. seems to be a cooperative effect for the oriented polymers of Geary et al., in contrast to a real surface energetic effect for the surface treated polymers of the present invention.

Such deformations, e.g., in the form of grooves, can readily be produced mechanically by, for example, uniaxial abrasion (scratching) of the surface. Tools suitable for the purpose will have protuberances at appropriate intervals, which will produce the necessary structuring of the surface. The tools or protuberances should be stable and hard enough to produce the desired deformation of the surface by abrasion. Examples of suitable tools are fibers, such as carbon fiber brushes, paper, needles, sputtered surfaces, among others. In general the deformation (grooves) will be about 1 to 100 nm deep and run at intervals of 1 to 100 nm. It can be considered particularly surprising that only one structured surface is sufficient to orient the entire liquid crystal layer.

After the liquid crystalline material has been coated on the substrate surface, the optical storage device so produced is tempered to orientate the coated liquid crystalline polymers. The conditions of temperature and duration of tempering depend on the thickness of the liquid crystalline layer, the molecular weight of the polymer and the difference between $T_g$ and $T_K$ for the specific liquid crystalline polymer. In general, the tempering process should be performed at least 1° C. below $T_K$ and preferably, at about 5° C. below $T_K$ in order to provide a well orientated liquid crystalline layer. Sufficiently complete orientation is generally achieved within about 1–30 minutes, although the time for tempering may be longer or shorter and is governed by the time required to achieve complete orientation of the liquid crystalline layer. In general, for polymers where $T_K - T_g$ is about 80°–100° C., orientation can be suitably achieved by tempering for a time from about 1–30 minutes.

Other features of the invention will become apparent in the course of the following descriptions of exemplary embodiments which are given for illustration of the invention and are not intended to be limiting thereof.

EXAMPLES

Example 1 —Coating Glass Plates

Flat glass plates were used with dimensions 70×70 to 200×300 mm and a thickness from 1.1–0.85 mm, which were polyimide-coated and uniaxially structured. The polymer used in the coating is a copolymer with the composition:

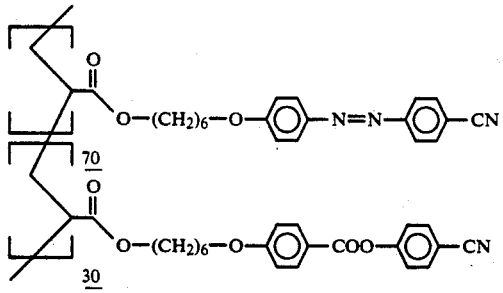

$M_w$=6.100–6.500 g/mole.

The solutions used had a copolymer content of 5–25% by weight in methylene chloride, stabilized with 0.2% by weight of TINUVIN 770 made by Ciba Geigy AG and 0.01% by weight IRGANOX 1076.

After dissolving, the solutions were filtered 2–3 times through an 0.2 micron Teflon filter (made by Nucleopor) until they were free of dust, and the filtrate was applied to the glass plates under dustfree conditions at drawing speeds of 50–200 cm/min.

Immediately after coating, the samples were dried under normal conditions in a drying chamber. Orientation was accomplished by tempering at between 105° and 95° C. at a cooling rate of about 2 K/min. The result were transparent, fully homogeneously oriented films with a layer thickness of 1.4–1.7 microns. The plates thus obtained could be used, for example, for data storage, particularly holographic data storage. (c.f. FIG. 1.)

FIG. 1 shows the UV-VIS absorption spectra of the sample described above. The absorbance was determined parallel and perpendicular to the thin orientated polymer layer with respect to the orientation. $E_\|$ represents the value for the absorbance parallel and $E_{195}$ for the absorbance perpendicular to the orientation in the polymer layer. The orientation parameter S was calculated according to formula 1, S=0.67.

$$S = \frac{E_\| - E_\perp}{E_\| + 2E_\perp} \qquad (1)$$

Example 2 —Coating glass plates

In general, the procedure described in Example 1 was followed. A polymer having the following structure was used for the liquid crystal polymer (MW=1.5×10$^4$ g/mole)

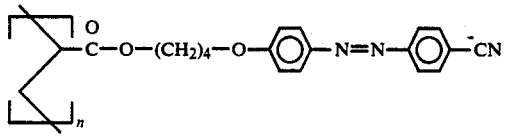

The polymer, in a 10–20% by weight methylene chloride solution, was centrifuged in a varnish centrifuge at a velocity V=500–1,000 r pm (t=1 min). Orientation was accomplished at between 140° and 130° C. in a drying chamber.

The films obtained were transparent, dark-orange colored, homogeneously orientated films with a layer thickness from 0.5 to 1.5 microns. Such films are also suitable for data storage, particularly for holographic data storage.

Example 3 —Coating Glass Plates

The procedure followed was analogous to that in Example 2. A polymer having the following structure was used for the liquid crystalline polymer (MW=30.000–45.000);

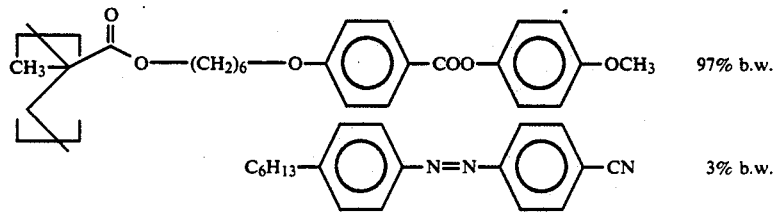

Figure 2:
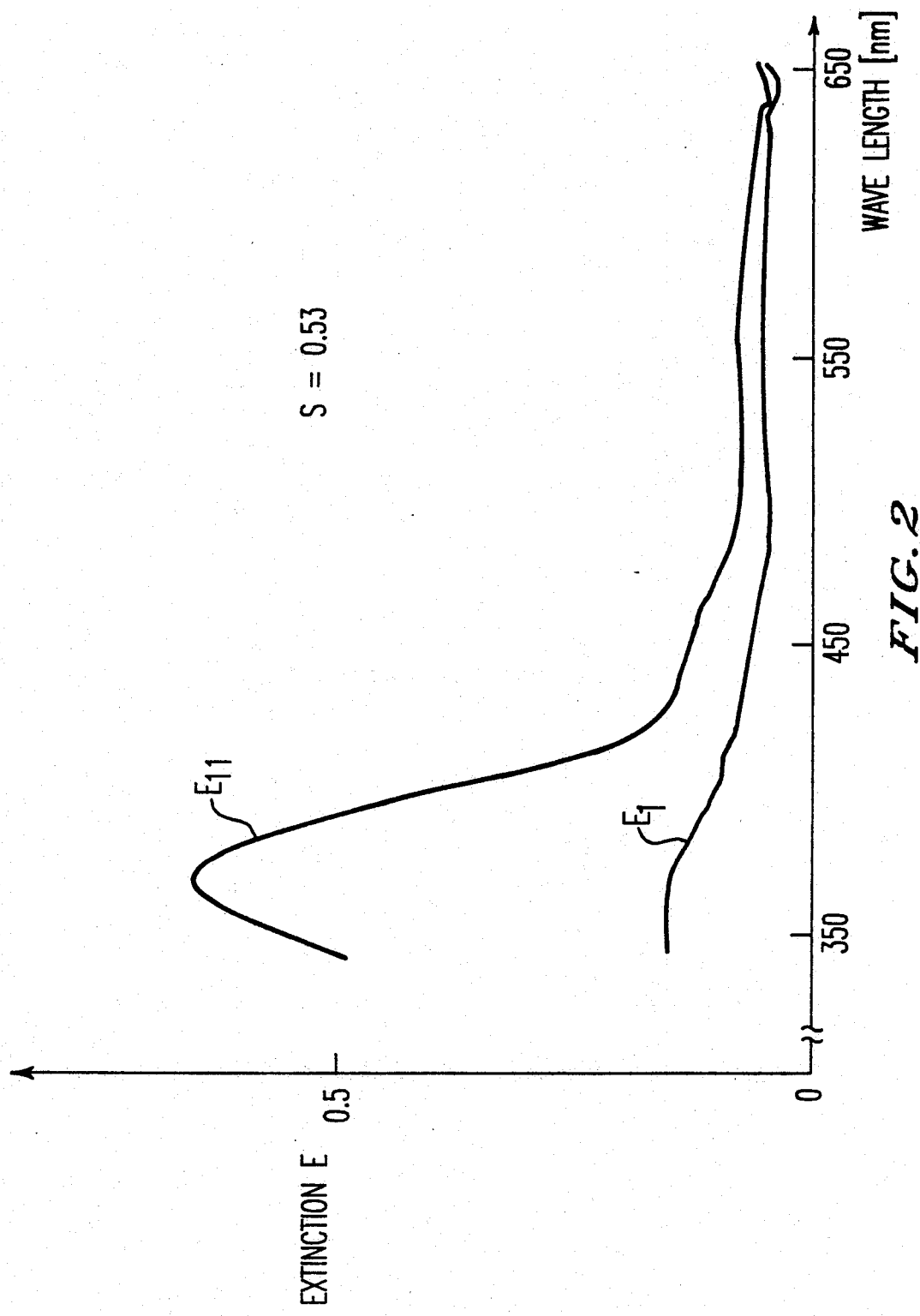
FIG. 2 shows a UV-VIS spectrum of the polymer of Example 3 coated on a polyimide-treated glass sheet and oriented.

A 10% solution in CH$_2$Cl$_2$ was applied and doped with 3% of an azo-dye (based on the polymer). Orientation was accomplished by tempering between 100° C. and 90° C. FIG. 2 shows the UV-VIS absorption spectra from which a orientation parameter S=0.53 was calculated using formula 1.

Example 4

The procedure followed was analogous to that in Example 1. A mixture of a polymer with the following structure and various azo dyes with a composition of 97/3 was used for the coating procedure.

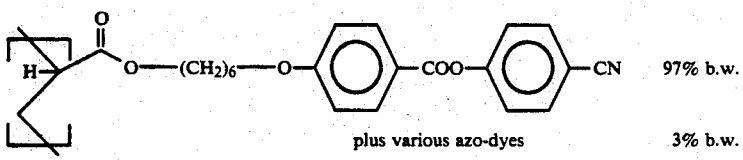

plus various azo-dyes

97% b.w.

3% b.w.

A 5% solution in cyclopentanone was applied. The orientation was achieved by exposing the samples to a temperature $T_{orient}$ which is shown in Table 1. The orientation parameter was calculated as shown in Example 1 at the wavelength λmax.

TABLE 1

| sample | $T_{n,i}$[°C.] | $T_{orient}$[°C.] | S | λmax [nm] |
|---|---|---|---|---|
| 4/dye 1 | 112 | 106 | 0.34 | 530 |
| 4/dye 2 | 108 | 103 | 0.54 | 530 |
| 4/dye 3 | 74 | 70 | 0.49 | 515 |
| 4/dye 4 | 80 | 75 | 0.57 | 515 |
| 4/dye 5 | 113 | 106 | 0.43 | 535 |

The dyes nos. 1-5 have the following formulas:

DYE 1

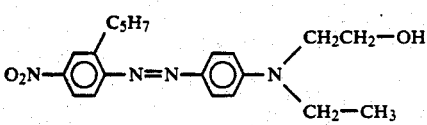

DYE 2

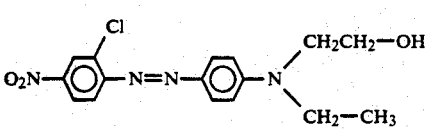

DYE 3

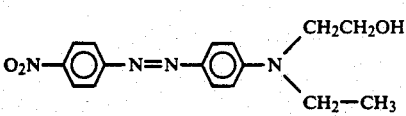

DYE 5

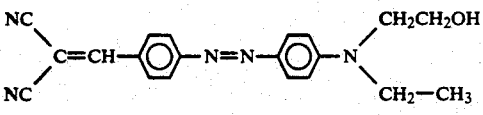

DYE 4

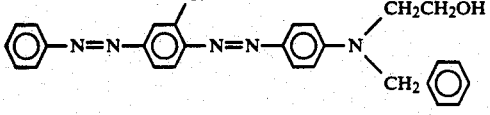

Obviously, numerous modifications and variations of the invention are possible in the light of the above teachings. It is therefore to be understood that within the scope of the appended claims, the invention may be practiced otherwise than as specifically described herein.

What is claimed as new and desired to be secured by Letters Patent of the United States is:

1. A process for producing an anisotropic layer of a liquid crystalline substance on one substrate, comprising the steps of:
   deforming a surface of the one substrate by producing parallel grooves on said surface,
   applying a 0.1–5 micron layer of a liquid crystalline substance capable of being oriented by said grooves onto said grooved surface, wherein said grooves orient said liquid crystalline substance, and tempering the liquid crystalline substance.

2. The process according to claim 1, wherein the liquid crystalline substance is selected from the group consisting of liquid crystal main chain polymers, liquid crystal side chain polymers and mixtures thereof.

3. The process according to claim 1, wherein the liquid crystalline substance contains a chromophore group.

4. The process according to claim 1, wherein the liquid crystalline substance in applied in the fluid phase.

5. The process according to claim 4, wherein said fluid phase comprises a solvent solution of said liquid crystalline substance, wherein said solvent is selected from the group consisting of inert alkyl halide, aromatic hydrocarbon, alcohol, ketone, ether and ester solvents and mixtures thereof.

6. The process according to claim 1, wherein the liquid crystalline substance is applied as a melt of the liquid crystalline substance.

7. The process according to claim 1, wherein a transparent covering layer is applied on top of the anisotropic layer.

8. The process according to claim 7, wherein said transparent covering layer comprises a glass or an amorphous polymer having a refractive index which is substantially similar to the refractive index of said liquid crystalline substance.

9. The process according to claim 2, wherein said liquid crystalline substance further comprises a stabilizing polymeric material having a minimum viscosity greater than $10^4$ Pa.s.

10. The process according to claim 9, wherein said stabilizing material is selected from the group consisting of acrylate polymers, polyvinyl alcohol polymers, polyvinyl acetal polymers and ethylene-vinyl acetate copolymers.

11. The process according to claim 1, wherein said deforming step comprises producing said grooves directly in the surface of said one substrate.

12. The process according to claim 11, wherein said grooves are mechanically produced.

13. The process according to claim 12, wherein said grooves are produced by abrasion.

14. The process according to claim 12, wherein said grooves are produced by contacting a surface of said one substrate with a tool possessing groove-generating projections on the surface thereof.

15. The process according to claim 14, wherein said tool comprises fibers, papers, needles or sputtered surfaces possessing groove-generating projections.

16. The process according to claim 12, wherein said one substrate comprises a photostructurable material and wherein said grooves are produced by irradiating the surface of said photostructurable support with high-energy radiation.

17. The process according to claim 1, wherein said deforming step comprises applying to said one substrate a layer of groove-producing material.

18. The process according to claim 17, wherein said groove-generating material is selected from the group consisting of polyimides, poly(meth)acrylates, polystyrene, polyvinyl alcohols, silicon dioxide, polyethylene terephthalate, nylon 66 and alkyl silanes.

19. The process according to claim 17, wherein said layer of groove-generating material has a thickness sufficient to permanently establish said grooves on the surface of said one substrate.

20. The process according to claim 19, wherein said layer of groove-generating material has a thickness of about 0.01–0.1 microns.

21. The process of claim 1, wherein a 0.3–4 micron layer of liquid crystalline substance is applied onto said grooved surface.

22. The process of claim 1, wherein a 1.4–1.7 micron layer of liquid crystalline substance is applied onto said grooved surface.

23. The process of claim 1, wherein a 0.5–1.5 micron layer of liquid crystalline substance is applied onto said grooved surface.

24. A data storage device, comprising:
one substrate, said one substrate having at least one surface, wherein said surface has parallel grooves therein, and
a 0.1–5 micron layer of oriented liquid crystalline material in contact with said grooved surface of said one substrate.

25. The device of claim 24, wherein said liquid crystalline material is selected from the group consisting of liquid crystal main chain polymers, liquid crystal side chain polymers and mixtures thereof.

26. The device of claim 24, wherein said grooves comprise a material interposed between the surface of said substrate and said liquid crystalline material.

27. The device of claim 24, further comprising a transparent covering layer in contact with said layer of liquid crystalline material.

28. The device of claim 24, comprising a 0.3–4 micron layer of oriented liquid crystalline material.

29. The device of claim 24, comprising a 1.4–1.7 micron layer of oriented liquid crystalline material.

30. The device of claim 24, comprising a 0.5–1.5 micron layer of oriented liquid crystalline material.

* * * * *